(12) United States Patent
Bühler et al.

(10) Patent No.: US 6,958,374 B2
(45) Date of Patent: Oct. 25, 2005

(54) POLYAMIDE MOULDING MATERIAL WITH IMPROVED PROPERTIES

(75) Inventors: Friedrich Severin Bühler, Thusis (CH); Alwin Hermann Schwitzer, Domat/Ems (CH)

(73) Assignee: EMS-Chemie AG, Domat/EMS (CH)

( * ) Notice: Subject to any disclaimer, the term of this patent is extended or adjusted under 35 U.S.C. 154(b) by 23 days.

(21) Appl. No.: 10/416,244

(22) PCT Filed: Nov. 15, 2001

(86) PCT No.: PCT/EP01/13237

§ 371 (c)(1),
(2), (4) Date: Sep. 22, 2003

(87) PCT Pub. No.: WO02/40591

PCT Pub. Date: May 23, 2002

(65) Prior Publication Data

US 2004/0030023 A1 Feb. 12, 2004

(30) Foreign Application Priority Data

Nov. 20, 2000 (DE) .......................................... 100 57 455

(51) Int. Cl.[7] .......................... C08L 77/00; C08G 63/44; C08K 3/04

(52) U.S. Cl. ........................ 525/432; 524/117; 524/123; 524/126; 524/432; 524/495; 524/538; 528/288

(58) Field of Search ................................ 524/117, 123, 524/126, 432, 538, 495; 525/432; 528/288

(56) References Cited

U.S. PATENT DOCUMENTS 6,136,915 A * 10/2000 Ohara et al. ................. 524/538
6,528,560 B2 * 3/2003 Buhler ........................ 524/123

* cited by examiner

*Primary Examiner*—Tae H. Yoon
(74) *Attorney, Agent, or Firm*—J.C. Patents

(57) ABSTRACT

The present invention relates to semiaromatic semi-crystalline thermoplastic polyamide moulding materials having improved processing behavior, increased flowability, improved surface quality and improved mechanical properties, in particular, in conditioned state, the matrix of the polyamide moulding materials according to the present invention comprising at least 3 components: a semi-crystalline copolyamide (A) having the composition 66/6I/6T, a PA prepolymer (B) having the composition 6T/6I/66 or 6T/6I/6 and an amorphous copolyamide (C) having the composition 6I/6T.

24 Claims, 1 Drawing Sheet

POLYAMIDE MOULDING MATERIAL WITH IMPROVED PROPERTIES

The invention relates to unreinforced and reinforced polyamide moulding materials having improved processing behaviour, increased flowability, improved surface quality and improved mechanical properties, specially, in conditioned state. The moulding material according to the present invention is suitable for production of moulded articles, specially having high wall thickness, or other semifinished products or assembly units which are fabricable by, e g. extrusion, extrusion blow-moulding, extrusion blow- and stretch-moulding, pultrusion, injection moulding, micro injection moulding, gas injection moulding (GIT), injection-blow moulding, or other forming techniques.

Reinforced polyamide blends are of increasing importance in the field of technical constructional materials which have to show for use in visual range an optimal surface quality besides high rigidity, tenacity and heat dimensional stability. Fields for use are inner and outer parts in the automobile field and in the field of other vehicles, housing material for appliances and devices for telecommunication, entertainment electronics, household appliance, machine construction, field of heating and mounting parts for installations. In addition, outer parts being exposed to weathering require an appropriate stability to ensure the necessary function for several years.

The special advantage of reinforced polyamides is the extremely good bond between polymer matrix and reinforcing materials. Thereby, reinforcing ratios are possible leading to high-rigid products being even good processable by injection moulding process due to the low melt viscosity of semi-crystalline polyamides.

In the following, polyamides have to be understood to be such polymers, wherein the monomer units are preponderant, i.e. up to at least about 60%, linked together by linkages of amides, i.e. with CO—NH-linkages. Herein, the following polymers are possible: Homopolymers and copolymers deriving from dicarboxylic acids, diamines, amino-carboxylic acids and/or lactames. E. g. polyamide (PA) 6, PA 66 and PA 46 and their mixtures are mentioned as polyamides having aliphatic structure. The certification of the polyamides corresponds to international standard ISO 1874-1, the first number indicating the C atom number of the starting amine and the last number indicating the C atom number of the dicarboxylic acid. When only one number is given, that means that one starts from an amino-carboxylic acid or its lactam, respectively (see, H. Domininghaus, Die Kunststoffe und ihre Eigenschaften, (Plastics and their properties) published by VDI 1976, p. 272).

Thereby, the diamine is always cited at first position for AA-BB type polyamides. For example, the polyamide from hexamethylene diamine and sebacic acid is designated as polyamide 610 (PA 610), the polyamide from caprolactam is designated as PA 6.

Sometimes, special combination of letters exists for aromatic and cycloaliphatic monomers, for example, T for terephthalic acid, I for isophthalic acid, MACM or PACM for bis(4-amino-3-methyl-cyclohexyl)methane or bis(4-amino-cyclohexyl)methane.

The components are separately listed by slants in order of their parts per amount and are followed by the parts per amount within brackets, e.g. copolyamide 6/66/610 (50:30:20) to characterize copolyamides.

The average of the molecular weight of the polyamides should be over 5000, preferably over 10000.

The drawback of unreinforced or reinforced semi-crystalline polyamide moulding materials such as, for example PA 66, is the strong decrease of the rigidity by water absorption in standard operating environment. Reinforced polyamide moulding materials (PA 66) lead to poor surfaces, in particular, for mouldings having high wall thickness due to the high melt temperature and an extremely high velocity of crystallization.

High amounts of reinforcing materials such as, for example glass fibres, into a rapidly congealing PA 66 polymer matrix reduce the flowability, for example, during the injection moulding processing and lead to reduced surface quality. In these cases, one attempts to maintain the filling ratio low and to achieve the rigidity by ribbing.

From DE 17 69 040 OS unreinforced moulding materials of semi-crystalline aliphatic polyamides and amorphous copolyamides being mixed in an extruder are known. Thereby, the crystallization ratio of the semi-crystalline polyamide is reduced, so that nearly transparent moulding parts are producable.

DE 26 42 244 C2 indicates that reinforced moulding materials can be produced by extruding amorphous MACMI/12 type copolyamides and semi-crystalline aliphatic polyamides thereby, changing the mechanical properties.

EP 70001 B2 describes unreinforced and reinforced moulding materials on the basis of semi-crystalline aliphatic polyamides and amorphous polyamides consisting of 40–98 mol-% of units of isophthalic acid, 2–60 mol-% of units of terephthalic acid, 50–98 mol-% of units of hexamethylene diamine and 2–50 mol-% of units of bis(p-aminocyclohexyl)-methane (PACM). Thereby, the tenacity of the moulding materials should be improved. The drawback of these mixtures is the risk that inhomogenities in the moulded article can arise as a result of phase separation.

By adding 30–95 wt.-% of amorphous polyamides such as, for example, hexymethylene isophthalamide PA 6I (DE 37 05 228 A1, EP 279 342 A1) to reinforced PA 66 improved flow properties of the melting and increased elongation at tear of the moulding part are found. At the same time an improvement of the surface quality (DE 32 00 428 C2) is achieved. The drawback of these mixtures is the risk that inhomogenities in the moulded article can arise as a result of phase separation. Further, the heat dimensional stability decreases with increasing amount of PA 6I. The difference of the rigidities in the dry and conditioned state increases with decreasing amount of PA 6I.

EP 1 010 726 A1 describes reinforced polyamide moulding materials on the basis of PA 66/6I copolymer with 70–95 wt.-% of units of semi-crystalline PA 66 and 30–50% of units of amorphous PA 6I having special glass fibres having a diameter of 15 to 30 $\mu$m and aspect ratios of 9 to 18. When the crystallization temperature is below 210° C. particularly high surface qualities of the moulding part should arise. It can be shown by our comparison examples VB9 to VB 12 that the surface is influenced by the viscosity of the Compound and less by the crystallization temperature.

In EP 1 010 726, relatively low rigidities are achieved despite high filling ratios of 60 wt.-% of glass fibre. A noticable drawback of these products is the strong decrease of the rigidity upon water absorption.

EP 400 428 A1 describes moulding materials made from semi-crystalline semiaromatic copolyamides (6T/6) which are extruded with amorphous copolyamides (6I/6T: 60/40 wt.-%). The advantage of these moulding materials is the improved tenacity with regard to pure CoPA 6T/6 and PA 66. The CoPA 6T/6 have a melting range being above PA 66 and accordingly require high processing temperatures and moulding temperatures.

Excellent surface qualities are obtained at high filling ratios (DE 43 21 247 C2), when a copolymer such as, for example a PA 66/6I, is produced from the constituents of a semi-crystalline polyamide such as PA 66 (70–95 wt.-%) and an amorphous polyamide such as PA 6I (5–30 wt. %). These products are stable with regard to demixing, while no incompatible blend components exist. The constancy of the mechanical properties are unsatisfactory in dry and conditioned state. The decrease of the melting point has a disfavorable effect on the heat dimensional stability, also indicated as HDT (Heat Distortion Temperature).

Improved flowabilities without negative effect on the tenacity, rigidity and heat dimensional stability can be obtained by addition of 4–8% of a PA prepolymer based on the amount of the polymer matrix (DE 198 21 719 A1). A 6T/6I type semiaromatic PA of the composition 70/30 wt.-% having relative viscosities of 1.01 to 1.3, as measured in 0.5% solution of m-cresol, to a polymer matrix of PA 66, PA 66+PA 6I/6T (Blend) or PA 12 is used as PA prepolymer. The flow lengths and surfaces of the moulding parts can be strongly improved despite of high filling ratios of 50–70% of glass fibres. The drawback of these mixtures is also the risk that inhomogenities in the moulded article can arise as a result of phase separation. Further, blends, for example on basis of PA 66 with PA prepolymer, show still strong differences of the rigidity in dry and conditioned state.

EP 0 272 695 B2 describes multiphase thermoplastic mixtures comprising:
a) 60–95 wt.-% of a polyamide matrix, wherein at least 50 wt.-% of the polyamide matrix is constituted of aliphatic constituents, wherein the number average molecular weight of the polyamide or polyamides, respectively, in the matrix is between 3000 and 8000 and wherein the polyamide matrix has a sum of unbalanced end groups and each capped end groups being at least 200 equivalents per $10^6$ grams of polyamide and wherein the imbalance of end groups is at least 1.9/1 or more and the sum of the mentioned end groups is higher than 100, and
b) complementally, 10–40 wt.-% of at least one organic polymeric toughener having a tensile modulus (ASTDM D-882, relative moisture of 50%) below 10,000 psi or for a mixture of tougheners having an average modulus below 10,000, and a number average particle size less than 100 nanometers,
and wherein the blend has a notched Izod (ASTM D-256-56, average values of three bars taken at each end) of over 2 ft. lbs/inch, and additionally a tensile strength (ASTM D-638-585) and a melt flow (ASTM D-1238–73 at 280° C. and a load of 2160 g) such that the product of notched Izod in ft. lb/inch, tensile strength in 1000 of pounds/in$^2$ and flow in grams/10 minutes is greater than 5000 and wherein 0.5 to 15 wt.-% of the polyamide matrix are grafted to the toughener or entrapped in the toughener.

However, EP 0 272 695 B2 refers to the combination of high viscous and low viscous polyamide types for improving of the flow properties, but always in combination with tougheners. However, EP 0 272 695 B2 does not describe the advantages by the use of PA 66/6I/6T and PA 6I/6T polymers together with low viscous prepolymers, which influence the melting point, glass transition temperature and surface quality and minimizes the difference of the properties in dry and conditioned state.

Therefore, an object of the present invention is to provide polyamide moulding materials without risk of demixing of single components. The moulding materials should show differences as low as possible of the mechanical properties—such as, e.g. tensile strength, elastic modulus and impact strength—and have a high heat dimensional stability in dry state and in conditioned state. At the same time high flowabilities are desired at the processing, so that high-rigid moulding parts having excellent surface quality can be produced.

This object is solved by the polyamide moulding materials according to claim 1 as well as by the use according to claim 18 and the moulded articles according to claim 19.

The subclaims comprise advantageous, but not limiting, embodiments of the invention.

Figure 1:
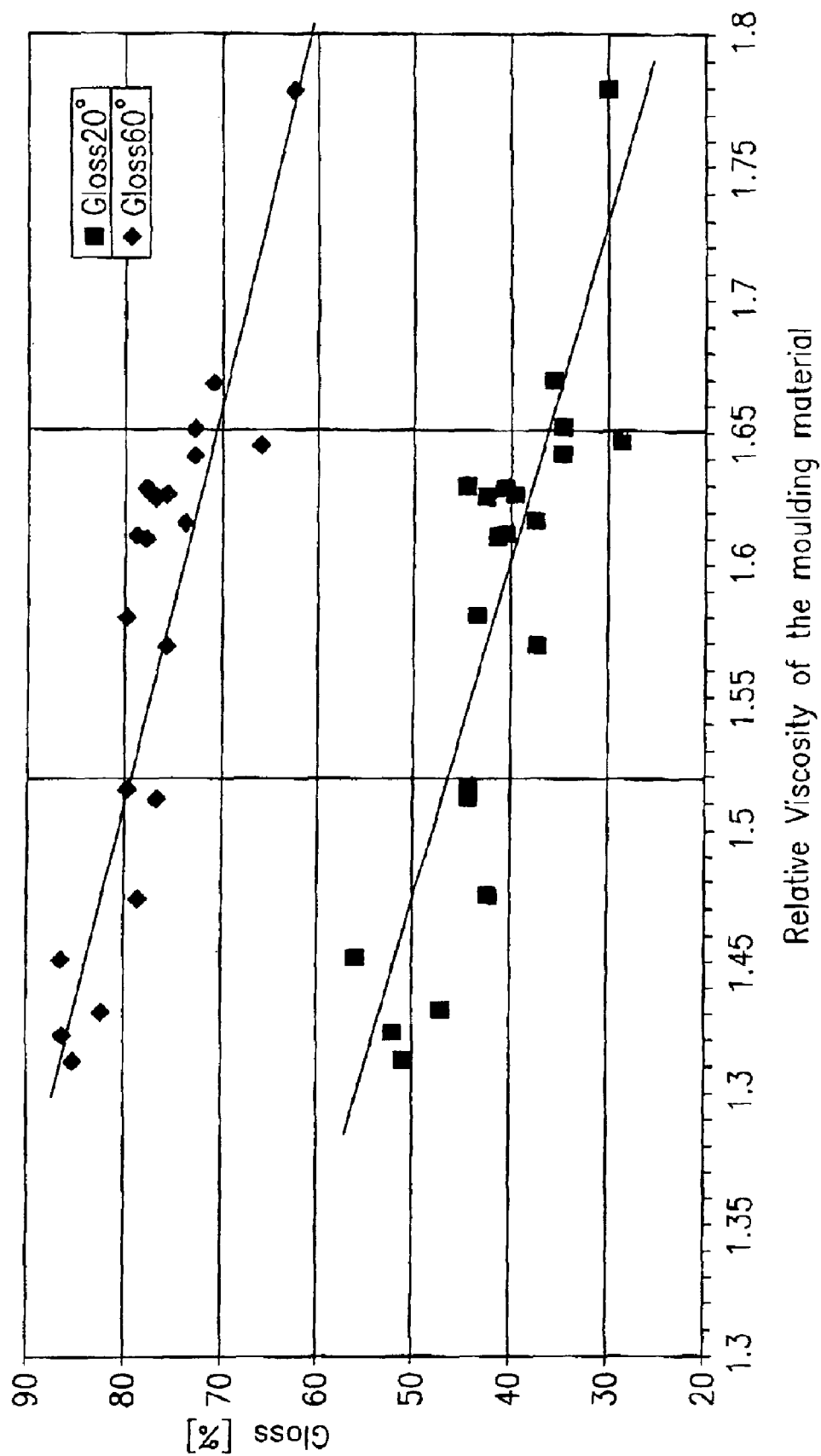
FIG. 1 shows a relationship between the gloss value and the relative viscosity of the molding material according to the present invention.

Surprisingly, it was found that a combination of a corresponding copolymer such as, for example, PA 66/6I/6T or PA 6/6I/6T and amorphous polyamide PA 6I/6T and PA prepolymer such as, for example, PA 6T/6I having extremely low viscosity, enables improvements of the flowability and surface quality without the risk of inhomogenities by demixing the blends of the moulded article. At the same time, HDT, tenacity and rigidity can be increased to high levels and the influence of water absorption during conditioning can be reduced by means of appropriate selection of the components.

Thereby, the ratio of the amorphous amount of PA 6I/6T and the semi-crystalline amount of PA 66 or PA 6 of the copolymer as well as structure and viscosity of the PA prepolymer 6T/6I are of great importance. The ratio of PA 66 or PA 6, respectively, and PA 6I/6T of the copolyamide influences the melting point, the melt enthalpy, the crystallization temperature, the crystallization enthalpy, the velocity of crystallization and the Tg (glass transition temperature). By using the same monomer components which are present in the PA prepolymer PA 6T/6I and in the amorphous PA 6I/6T and in semi-crystalline PA 66/6I/6T or PA 6/6I/6T, respectively, for the corresponding copolymer, presumably, a compatibility effect with regard to the pure incompatible semi-crystalline and amorphous polyamide components results.

The same advantages in relation to the compability of the Compound are expected for a PA 6T/6I/66 type or PA 6T/6I/6 type PA prepolymer. The tenacity can be controlled by the viscosity of the copolymer. Via addition of PA prepolymer the flow length and the surface quality are increased and the water absorption is reduced. By addition of a further component such as, for example amorphous PA 6I/6T, the difference of rigidity can be reduced in dry and conditioned state.

The necessarily required semi-compatible prepolymer reduces the velocity of crystallization of the matrix without substantially influencing the crystallization enthalpy of the matrix. Thereby, the flowability of the melting can be increased and the heat dimensional stability of the moulding part can be maintained on a high level. Preferably, the PA prepolymer comprises an amount of the components of the copolymer and has a low viscosity and a melting point as high as possible.

With regard to the copolymer PA 66/6I (DE 43 21 247 C2) the copolymer PA 66/6I/6T has a further advantage that melting point and HDT can be increased by setting-up the ratio of 6T>6I while the amount of 6T/6I is increased simultaneously.

Due to the improved melting flow the improved compability of components and thereby, the reduced risk of demixing as well as the reduced velocity of crystallization and water absorption, optical high-quality moulding parts are producable in larger dimensions. At the same time the improved compability of components causes a reduced tendancy to extrusion die depositions and delaminations. A particular advantage of the products having extremely smooth surfaces, being prepared by the moulding material according to the present invention is shown by the excellent metallizability according to electroplating, lamination and vaporization methods. Further, by using gas injection methods (GIT) high-quality products are formed.

The invention is characterized in that a corresponding copolymide comprises each corresponding components of the PA prepolymer and the semi-crystalline and amorphous polyamides and, thereby, a compatibilitizing effect is achieved. The ratio of the amorphous and the semi-crystalline units according to the present invention can be set-up in the moulding material, so that heat dimensional stability as high as possible arises and similar rigidities are obtained in dry and conditioned state.

The particular feature of the moulding material according to the present invention is that besides the PA prepolymer a corresponding copolymer always is present that functions compabilitizing with regard to the amorphous and semi-crystalline PA components and the PA prepolymer, thus, reducing the risk of demixing during the processing.

The necessarily required semi-compatible PA prepolymer reduces the velocity of crystallization of the matrix without substantially influencing the crystallization enthalpy of the matrix. Thereby, the flowability of the melting can be increased and the heat dimensional stability of the moulding part can be maintained on a high level. Due to the improved melting flow the improved compability of components and the reduced velocity of crystallization, optical high-quality moulding parts are producable in larger dimensions.

The corresponding copolyamides consists of the components of the amorphous and/or semi-crystalline matrix polymers and the components of the PA prepolymer. For example, if the matrix of the reinforced PA blend consists of PA 66 or PA 6 and/or an amorphous 6I/6T polyamide, then, in particular, copolymers of the composition PA 66/6I/6T or PA 6/6I/6T are suitable, which function presumably as compatibilisators and contribute to the increase of the flowability. The ratio of the components PA 66 and PA 6I/6T influences the surface quality of the moulding part which can be measured via the gloss value.

For example, a gloss optimum in the range of the composition of 70/20/10 to 90/7/3 wt.-% for PA 66/6I/6T or PA 6/6I/6T copolymer having 50 wt.-% of glass fibres has been found.

For example, according to DE 43 21 247 C2, a gloss optimum of the PA 66/6I copolymer has been found for the composition 66:6I=80:20 wt.-%. Decisive drawback is the strong decrease of the elastic modulus in conditioned state, a low HDT value and a high water absorption.

The matrix of the polyamide moulding materials according to the present invention comprises at least 3 components: a semi-crystalline copolyamide (A) having the composition 66/6I/6T, a PA prepolymer (B) having the composition 6T/6I/66 or 6T/6I/6 and an amorphous copolyamide (C) having the composition 6I/6T. The three components (A), (B) and (C) are defined as follows:

(A) 42–98 wt.-% of a copolyamide formed by
- ($a_1$) 47–90 wt.-% of units derived from adipic acid in combination with hexamethylene diamine in nearly equimolar ratio or from caproplactam and/or from ω-amino acids having 6 C atoms,
- ($a_2$) 50–7 wt.-% of units derived from isophthalic acid in combination with hexamethylene diamine in nearly equimolar ratio,
- ($a_3$) 40–3 wt.-% of units derived from terephthalic acid in combination with hexamethylene diamine in nearly equimolar ratio,
the wt.-% of the components ($a_1$) to ($a_3$) making up together 100%;

(B) 9–1 wt.-% of prepolymeric polyamides having a solution viscosity (ηrel.) of 1.01–1.30, as measured 0.5% in m-cresol, formed by
- ($b_1$) 40–90 wt.-% of units derived from terephthalic acid in combination with hexamethylene diamine in equimolar ratio,
- ($b_2$) 50–10 wt.-% of units derived from isophthalic acid in combination with hexamethylene diamine in nearly equimolar ratio,
- ($b_3$) 0–50 wt.-% of units derived from adipic acid in combination with hexamethylene diamine in nearly equimolar ratio or from caproplactam and/or from ω-amino acids having 6 C atoms,
the wt.-% of the components ($b_1$) to ($b_3$) making up together 100%;

(C) 49–1 wt.-% of an amorphous copolyamide formed by
- ($c_1$) 40–90 wt.-% of units derived from isophthalic acid in combination with hexamethylene diamine in equimolar ratio,
- ($c_2$) 50–10 wt.-% of units derived from terephthalic acid in combination with hexamethylene diamine in equimolar ratio,
- ($C_3$) 0–50 wt.-% of units derived from adipic acid in combination with hexamethylene diamine in nearly equimolar ratio or from caproplactam and/or from ω-amino acids having 6 C atoms,
the wt.-% of the components ($c_1$) to ($C_3$) making up together 100%.

Further, the total moulding material can comprise additionally 0–70 wt.-% of fibrous or particle type reinforcing material and/or filling material (D) and 0–6 wt.-% of carbon black (E). Together, the components (A) to (F) make up 100%.

Obviously, conventional stabilizer, lubricants, dyes, metal tinsel, metal pigments, stamped metal tinsel, flame retardants, impact-resistant modifiers, antistaticas, conducting additives, anti-tarnishing agents, mould release agents, optical brightening agents, aromatics, fungistatic substances etc. can be added as further components (0 to 30 wt-%) (component (F)).

Further, conventional additives are also, for example, stabilizers and oxiadation retardants, agents against heat decomposition and decomposition by UV light, lubricants and mould release agents, dyes, pigments and plasticizers. Oxidation retardants and heat stabilizer which can be added to the thermoplastic moulding materials according to the present invention are, e.g., halides of metals of the group I of the classification of elements, e.g., sodium halides, potassium halides, lithium halides, if required, in combination with cuprous (I) halides.

For example, red phosphorus, polybromstyrenes, such as, e.g., the commercial article Pyrochek 68 PB® and the other flame retardants known for polyamides, such as metal hydroxides such as $Mg(OH)_2$, $Mg(CO_3)_2$ are mentioned herein as flame retardants. It is recommendable to use a synergist in the case of employing halogen-containing flame retardants. Compounds of antimony, boron and tin are suitable. These were used generally in amounts of 0.5–10 wt.-% based on the thermoplastic materials.

A combination of 0–6 wt.-% of carbon black and 2–6 wt.-% of polyamide 12 can be used as particular effective stabilization against weathering. A combination of 0–6 wt.-% of carbon black, such as, in particular Black Pearls 880® from the company Cabbot or Corax N115® from the company Degussa and 2–6 wt.-% polyamide 12 can be used as particular effective stabilization against influence of weathering. For example, Grilamid®L16, Grilamid®L18, Grilamid®L20, Grilamid®L22 and Grilamid®L25 from the company EMS-CHEMIE AG, Domat/Ems, Switzerland, can be used as PA 12 products.

Single-shaft and, preferably, two-shaft extruders comprising appropriate transporting elements and knead elements can be employed to produce the moulding materials according to the present invention. Preferably, the copolymers, the PA prepolymer and, if required, the amorphous and/or the semi-crystalline polyamide are mixed with small amounts of additives and metered to the feed zone of the extruder. Glass fibres are introduced by a sidefeeder, preferably, as near as possible at the extrusion die.

If further powdery additives are employed corresponding mixtures are metered either separately into the feed zone or between the polymers and the glass fibre. Suitable melt temperatures are between 250° C. and 300° C. depending on the melting point of the polymers. Optionally, single additives can be used in the form of appropriate masterbatch pellets or as compacts.

The production of the moulding parts, semifinished products, extruded materials or hollow parts is performed by commercial installations. Suitable processing temperatures are between 250 and 300° C. Alternatively, additives and single components can be added in the form of appropriate masterbatch formulations directly within the processing installation.

The crystalline copolymer (A) and the amorphous polyamide (C) can comprise appropriate regulators or modifiers being known by those skilled in the art to limit the viscosity within the desired range. Preferably, monoamines having the following general formula are used: $CH_3$—$(R_1)$—NH—$(R_2)$—$CH_3$,
wherein $R_1$ and $R_2$ mean 0 to 36 $CH_2$-groups, wherein the monoamines can be cycloaliphatic type or branched type. Preferably, stearamine, cyclohexylamine, aniline, propylamine and nonylamine are used as appropriate monoamines according to the present invention. The amines can be used in low excess in comparison with the acid, i.e. in an excess of 0.2%.

In particular, the copolymer (A) according to the present invention, the prepolymeric polyamide (B) and the amorphous copolyamide (C) have a low amount of triamine, in particular, less than 0.3 wt.-%. This can be achieved by maintaining the residence time during the process of production very short and the processing temperatures relatively low and, thereby, preventing the formation of triamines.

Monocarboxylic acids with the following general formula are used as monocarboxylic acids (regulators or modifiers):
$CH_3$—$(R_1)$—COOH,
wherein $R_1$ means 0 to 36 $CH_2$-groups and wherein the monocarboxylic acids can be cycloaliphatic type or branched type. Preferably, acetic acid, formic acid, stearic acid, palmitic acid, cyclohexanecarboxylic acid are used. Alternatively, a mixed regulation of monoamine and monocarboxylic acid also can be used.

Further, according to the present invention regulators or modifiers, such as 4-amino-2,2,6,6-tetraalkylpiperidine or 2,6-dialkylphenols having methylamine or carboxyl function or regulator or modifier types comprising one or more of these groups are especially preferred.

According to a preferred embodiment of the invention, the semi-crystalline copolyamide (A), the prepolymeric polyamide (B), or the amorphous copolyamide (C) comprises catalytically active compounds on the basis of hypophosphorous acid, phosphorous acid, phosphoric acid in amounts of 10 to 500 mg/kg and, if reguired, antioxidants selected from the group of the sterically hindered hydroxyphenols or Hindered Amine Light Stabilizer (HALS) stabilizator in amounts of 0.05–5 wt.-% based on the polymerization formulation of the semi-crystalline copolyamide (A), the prepolymeric polyamide (B), or the amorphous polyamide (C), respectively.

Further, compounds on the basis of hypophosphorous acid, phosphorous acid or phosphoric acid or derivates of the sulfurous acid such as, e.g. sulfites, thiosulfates, etc. and approriate antioxidants such as, for example, sterically hindered hydroxyphenols can be added to the respective polymerization operation of the polymers (A) and (C).

Further, appropriate antifoaming agents on the basis of silicones and derivates of silicone can be used within polymerization operation, preferably, together with silic acid in form of stable aqueous emulsions.

An another modification is the addition of layered silicates such as, for example, montmorillonite, bentonite or mica, being present in the final product (nano-composites) into exfoilated form, preferably, with high aspect ratios, which are used either during the polymerization of the copolymer or directly during the extrusion of the moulding material.

Optionally, the polymerization operation can comprise appropriate release agents and lubricants such as, for example, fatty acid esters, waxes or fatty acid amides.

The relative solution viscosity of the copolymers (A), as measured in 0.5% solution of m-cresol, is between 1.4 and 1.9, preferably between 1.4 and 1.8, more preferred between 1.4 and 1.7.

The production of the copolymers (A) is performed according to known condensation methods for polyamides according to the batch method within pressurized reactors. Upon achieving the desired viscosity the polymer is discharged, cooled in a water bath, pelletized and dried.

The relative viscosity of the PA prepolymers, component (B) is set-up to 1.01 to 1.3, preferably, to 1.05 to 1.25, as measured in 0.5% solution of m-cresol. The production of the PA prepolymers is performed according to the method described in DE 198 21 719. Herewith, the disclosure of the DE 198 21 719 is made also to the subject of this application.

The relative solution viscosity of the amorphous copolymers (C), as measured in 0.5% solution of m-cresol, is between 1.35 and 1.70, preferably between 1.35 and 1.55. The production of the amorphous copolyamide, component (C) is performed according to known condensation methods for polyamides according to the batch method within pressurized reactors. Upon achieving the desired viscosity the polymer is discharged, cooled in a water bath, pelletized and dried.

In particular, 30–70 wt.-% of filling materials or reinforcing materials, based on the moulding materials, such as glass fibres, glass roving, glass globes, glass powders, polymer fibres, carbon fibres, metal fibres, mineral aggregates such as quartz, mica, feldspar, talcum, kaolin, wollastonite, preferably having a low particle size, high dispersion tendancy and high aspect ratios (length to width ratios) are used as component (D). Obviously, mixtures thereof or corresponding masterbatches can also be used.

The moulding materials according to the present invention are used for production of fibres, hollow parts, sheets and molded articles. The molded articles are produced from the moulding materials according to the present invention according to known methods for deforming polymer meltings by extrusion, extrusion blow-moulding, extrusion blow- and stretch-moulding, pultrusion, injection moulding, micro injection moulding, gas injection moulding (GIT), injection-blow moulding, or other forming techniques.

The molded articles produced by the moulding materials according to the present invention are used for production of inner and outer parts, preferably, having bearing function or mechanical function in the field of electrics, furniture, sport (such as, for example sticks, coatings for ski points, etc.), office chairs, cars and other vehicles, micro components and circuit boards in the field of electrics, in particular, in the field of low voltage technique or housing material for appliances and devices for telecommunication, entertainment electronics, household devices, machine construction, heating or mounting parts for installations and for containers and ventilating parts of all kinds.

Following examples should describe the invention but without limiting it.

EXAMPLES

Production of the Copolymers (A)

50 kg of monomer mixture according to table 1 and 15 L soft water based on the anhydrous operation were charged into a 130 L autoclave. Then, the autoclave is closed and heated to 200° C. with stirring within 2 h. Thereby, a pressure of 15–20 bar arises. Then, it is heated up to 280° C. with stirring and the pressure is maintained constant at 20 bar. Then, the pressure is relaxed to 1 bar and degassed with stirring for about 1 h until the desired moment of torsion of the stirrer is achieved. The finished polymer melting is discharged, cooled in a water bath, pelletized and dried to a water amount of <0.05%.

The production of the PA prepolymer 6T/6I, component (B) is performed according to the method according to DE 19821719. The part per weight of the component 6T is 70% and of the component 6I is 30%. The relative viscosity, as measured in 0.5% of m-cresol, is 1.13.

The amorphous copolyamide 6I/6T (Grivory® G21) from the company Ems-Chemie AG consisting of 66.6 wt.-% of 6I units and 33.4 wt.-% of 6T units is used as component (C). The relative viscosity, as measured in 0.5% of m-cresol, is 1.5.

TABLE 1

| Copolymers 66/6I/6T, component (A) | | | | | | | | | |
|---|---|---|---|---|---|---|---|---|---|
| | | C1 | C2 | C3 | C4 | C5 | C6 | C7 | C8 |
| Amounts | | | | | | | | | |
| 66 | wt.-% | 70 | 73 | 83 | 89 | 70 | 73 | 83 | 89 |
| 6I | wt.-% | 20 | 19 | 11 | 8 | 20 | 19 | 11 | 8 |
| 6T | wt.-% | 10 | 8 | 6 | 3 | 10 | 8 | 6 | 3 |
| Properties | Pellet | | | | | | | | |
| r.v. 0.5% m-cresol | | 1.82 | 1.81 | 1.60 | 1.60 | 1.88 | 1.84 | 1.79 | 1.80 |
| MVI/ 290° C./5 kg | ml/ 10 min | 79 | 119 | 635 | 630 | 36 | 53 | 99 | 147 |
| Tg | ° C. | 68 | 65 | 57 | 52 | 68 | 67 | 58 | 53 |
| Melt temperature | ° C. | 234 | 237 | 250 | 253 | 235 | 238 | 248 | 253 |

TABLE 1-continued

Copolymers 66/6I/6T, component (A)

|  |  | C9 | C10 | C11 | C12 | C13 | C14 | C15 |
|---|---|---|---|---|---|---|---|---|
| Amounts |  |  |  |  |  |  |  |  |
| 66 | wt.-% | 70 | 75 | 80 | 75 | 75 | 73 | 73 |
| 6I | wt.-% | 20 | 17 | 13 | 12.5 | 8 | 27 | 18 |
| 6T | wt.-% | 10 | 8 | 7 | 12.5 | 17 | 0 | 9 |
| Properties | Pellet |  |  |  |  |  |  |  |
| r.v. 0.5% m-cresol |  | 1.583 | 1.883 | 1.874 | 1.896 | 1.864 | 1.42 | 1.61 |
| MVI/ 290° C./5 kg | ml/ 10 min | 361 | 54 | 81 | 71 | 61 | 2470 | 1080 |
| Tg | ° C. | 67 | 64 | 61 | 64 | 64 | 64 | 64 |
| Melt temperature | ° C. | 237 | 242 | 246 | 247 | 253 | 227 | 239 | r.v. = relative viscosity;
MVI = Melt Viscosity Index;
min = minutes
Tg = Glass transition temperature
Granul. = pellet

Comparison Examples 1 to 4

Reinforced PA Blends

The moulding materials of the composition according to table 2 are produced on a ZSK25 type two-shaft extruder from the company Werner u. Pfleiderer. The pellets PA 66 and PA 6I/6T or PA 6I are mixed with masterbatch pellet PA66+carbon black (73/27 wt.-%) and metered into the feed zone. The glass fibre is metered into the polymer melting by a sidefeeder 3 housing units before the extrusion die.

The housing temperature was set-up as increasing profile up to 280° C. A flow rate of 8 kg was used at 150 rpm. After cooling the extruded columns in a water bath the properties of pellet were measured after pelletizing and drying at 120° C.

The specimens were produced on an Arburg injection moulding installation, setting-up the cylinder temperatures from 275 to 290° C. and a screw rotation rate to 250 rpm The moulding temperature was selected to be 100° C.

TABLE 2

|  |  |  | Example | | | |
|---|---|---|---|---|---|---|
| Formula | Condition | Unit | VB1 | VB2 | VB3 | VB4 |
| Formula Compound |  |  |  |  |  |  |
| PA 6I/6T: 67/33 wt.-% | r.v. 1.50/0.5% m-Kr | wt.-% | 19.6 | 12.4 |  |  |
| PA 6I: | r.v. 2.5/1.0% m-Kr | wt.-% |  |  | 12.4 | 9.9 |
| PA 66 Radipol ® A45* | Commercial article | wt.-% | 30 | 37.2 | 37.2 | 39.7 |
| Black carbon |  | wt.-% | 0.4 | 0.4 | 0.4 | 0.4 |
| Glass fibres |  | wt.-% | 50 | 50 | 50 | 50 |
| Properties Compound |  |  |  |  |  |  |
| units 66/6I/6T | Composition | wt.-% | 60/27/13 | 75/17/8 | 75/25/0 | 80/20/0 |
| r.v. Compound |  | 0.5% m-Kr | 1.709 | 1.773 | 1.802 | 1.812 |
| MVI-Compound | 290° C./5 kg Pellet | ml/10 min | 24 | 12 | 12 | 18 |
| Glass transition temperature | Tg | ° C. | 72 | 73 | 79 | 71 |
| Melt temperature | Tm | ° C. | 259 | 260 | 262 | 260 |
| Melt enthalpy | DHm | J/g | 22 | 29 | 27 | 26 |
| Crystallization temperature | Tc | ° C. | 221 | 226 | 233 | 234 |
| Crystallization enthalpy | dHc | J/g | 19 | 23 | 20 | 21 |
| Velocity of crystallization | dHm/dT | J/g/min | 12 | 14 | 15 | 16 |
| Production of specimens Injection | Engine speed/MT/WT rpm/° C./° C. |  |  |  |  |  |
| Elastic modulus | 250/290/100 | MPa | 16000 | 17000 | 17000 | 17000 |
| Elastic modulus, cond | 250/290/100 | MPa | 17000 | 16000 | 16000 | 16000 |
| Ult. Tensile strength | 250/290/100 | MPa | 240 | 239 | 228 | 240 |
| Ult. Tensile strength, cond | 250/290/100 | MPa | 205 | 216 | 202 | 199 |
| Elongation at tear | 250/290/100 | % | 2.6 | 2.5 | 2.8 | 2.5 |
| Elongation at tear, cond | 250/290/100 | % | 2.5 | 3 | 3.1 | 3.1 |
| KSZ (Charpy) | 250/290/100 | kJ/m² | 15 | 12 | 13 | 13 |

TABLE 2-continued

| Formula | Condition | Unit | Example | | | |
|---|---|---|---|---|---|---|
| | | | VB1 | VB2 | VB3 | VB4 |
| KSZ (Charpy), cond | 250/290/100 | kJ/m² | 13 | 12 | 12 | 14 |
| SZ (Charpy) | 250/290/100 | kJ/m² | 91 | 92 | 90 | 90 |
| SZ (Charpy), cond | 250/290/100 | kJ/m² | 86 | 78 | 81 | 87 |
| HDT/A (1.8 Mpa) | 250/290/100 | ° C. | 230 | 238 | 240 | 246 |
| HDT/C (8 MPa) | 250/290/100 | ° C. | 120 | 167 | 148 | 176 |
| Flow length 1.5 × 10 mm | 250/290/100 | mm | 185 | 170 | 162 | 180 |
| WT/dye lamina/3 mm | 250/290/WT | ° C. | 100 | 100 | 100 | 100 |
| Gloss 20° | Dye lamina | % | 28 | 25 | 17 | 15 |
| Gloss 60° | Dye lamina | % | 70 | 62 | 50 | 49 |
| Moisture absorption | 2 Wo/70° C./62% rF | % | 1.219 | 1.12 | 1.12 | 1.09 |

*commercial article of the company Radici (IT)
MT = melt temperature
WT = mould temperature
RF = relative moisture
Wo = weeks
Kr = cresol Comparison Examples 5 to 8

Reinforced Copolyamides

The moulding materials according to table 3 are produced on a ZSK25 type two-shaft extruder from the company Werner u. Pfleiderer. Copolyamide pellet and masterbatch pellet PA66+carbon black (Black Pearls®880) (73/27 wt.-%) are previously mixed with a roll aid agent (liquid fatty acid ester), 0.1 wt.-%, and metered into the feed zone of the extruder. The glass fibre is metered into the polymer melting 3 housing units before the extrusion die by a sidefeeder.

The housing temperature was set-up as increasing profile up to 280° C. A flow rate of 8 kg was used at 150 rpm. After cooling the extruded columns in water bath the properties of pellet were measured after pelletizing and drying at 120° C.

The specimens were produced on an Arburg injection moulding installation, setting-up the cylinder temperatures from 275 to 290° C. and a screw rotation rate to 250 rpm The moulding temperature was selected to be 100° C.

TABLE 3

| Formula | | | Ex. | | | |
|---|---|---|---|---|---|---|
| | | | VB5 | VB6 | VB7 | VB8 |
| | | | Copolymer | | | |
| Compound | Condition | Unit | C1 | C2 | C3 | C4 |
| Copolyamide 66/6I/6T | Comp. | wt. % | 70/20/10 | 73/19/8 | 83/11/6 | 89/8/3 |
| r.v. Copolyamide | 0.5% m-Kr | | 1.82 | 1.81 | 1.6 | 1.6 |
| Formula Compound | | | | | | |
| Copolyamide 66/6I/6T | See above | wt.-% | 48.5 | 48.5 | 48.5 | 48.5 |
| PA 66 Radipol ® A45 | Commercial article | wt.-% | 1.1 | 1.1 | 1.1 | 1.1 |
| Black carbon | | wt.-% | 0.4 | 0.4 | 0.4 | 0.4 |
| Glass fibres | | wt.-% | 50 | 50 | 50 | 50 |
| Properties Compound | | | | | | |
| Units 66/6I/6T | Composition | wt.-% | 71/19/10 | 74/18/8 | 84/11/5 | 89/8/3 |
| r.v. Compound | 0.5% m-Kr | | 1.833 | 1.778 | 1.668 | 1.645 |
| MVI-Compound | 290° C./5 kg Pellet | ml/10 min | 12 | 29 | 92 | 107 |
| Glass transition temperature | Tg | ° C. | 67 | 65 | 57 | 55 |
| Melt temperature | Tm | ° C. | 235 | 237 | 248 | 252 |
| Melt enthalpy | DHm | J/g | 23 | 24 | 27 | 28 |
| Crystallization temperature | Tc | ° C. | 203 | 204 | 220 | 224 |
| Crystallization enthalpy | DHc | J/g | 16 | 18 | 22 | 22 |
| Velocity of crystallization | dHm/dT | J/g/min | 7 | 9 | 10 | 11 |
| Production of specimens Injection. | Engine speed/MT/WT rpm° C./° C. | | | | | |
| Elastic modulus | 250/290/100 | MPa | 17000 | 17000 | 18000 | 18000 |
| Elastic modulus, cond | 250/290/100 | MPa | 16000 | 15000 | 14000 | 14000 |
| Ult. Tensile strength | 250/290/100 | MPa | 228 | 234 | 246 | 250 |
| Ult. Tensile strength, cond | 250/290/100 | MPa | 168 | 168 | 172 | 170 |
| Elongation at tear | 250/290/100 | % | 2.4 | 2.5 | 2.4 | 2.4 |
| Elongation at tear, cond | 250/290/100 | % | 3.2 | 3.1 | 3 | 3 |
| KSZ (Charpy) | 250/290/100 | kJ/m² | 14 | 13 | 13 | 13 |
| KSZ (Charpy), cond | 250/290/100 | kJ/m² | 13 | 13 | 13 | 13 |

TABLE 3-continued

|  |  |  | Ex. | | | |
| --- | --- | --- | --- | --- | --- | --- |
|  |  |  | VB5 | VB6 | VB7 | VB8 |
| Formula |  |  | Copolymer | | | |
| Compound | Condition | Unit | C1 | C2 | C3 | C4 |
| SZ (Charpy) | 250/290/100 | kJ/m$^2$ | 100 | 100 | 83 | 91 |
| SZ (Charpy), cond | 250/290/100 | kJ/m$^2$ | 74 | 72 | 75 | 77 |
| HDT/A (1.8 MPa) | 250/290/100 | ° C. | 216 | 219 | 239 | 245 |
| HDT/C (8 MPa) | 250/290/100 | ° C. | 147 | 169 | 209 | 216 |
| Flow length 1.5 × 10 mm | 250/290/80 | mm | 158 | 174 | 258 | 257 |
| Flow length 1.5 × 10 mm | 250/290/100 | mm |  |  |  |  |
| WT/dye lamina/3 mm | 250/290/WT | ° C. | 100 | 100 | 100 | 100 |
| Gloss 20° | Dye lamina | % | 27 | 29 | 35 | 28 |
| Gloss 60° | Dye lamina | % | 66 | 62 | 71 | 66 |
| Moisture absorption | 2 Wo/70° C./62% rF | % | 1.38 | 1.43 | 1.38 | 1.43 |

Comparison Examples 9 to 12

Reinforced Copolyamides with PA Prepolymer

The production of the reinforced copolyamides with PA prepolymer is performed according to the Formulas of table 4. The moulding materials are produced on a ZSK25 type two-shaft extruder from the company Werner u. Pfleiderer. Copolyamide, PA prepolymer and masterbatch pellet PA66+ carbon black (Black Pearls®880) (73/27 wt.-%) are previously mixed with a roll aid agent (liquid fatty acid ester), 0.1 wt.-%, and metered into the feed zone. The glass fibre is metered into the polymer melting 3 housing units before the extrusion die by a sidefeeder.

The housing temperature was set-up as increasing profile up to 280° C. A flow rate of 8 kg was used at 150 rpm. After cooling the extruded columns in water bath the properties of pellet were measured after pelletizing and drying at 120° C.

The specimens were produced on an Arburg injection moulding installation, setting-up the cylinder temperatures from 275 to 290° C. and a screw rotation rate to 250 rpm The moulding temperature was selected to be 100° C.

TABLE 4

|  |  |  | Ex. | | | |
| --- | --- | --- | --- | --- | --- | --- |
|  |  |  | VB9 | VB10 | VB11 | VB12 |
| Formula |  |  | Copolymer | | | |
| Compound | Condition | Unit | C5 | C6 | C7 | C8 |
| Copolyamide 66/6I/6T | Comp. | wt.-% | 70/20/10 | 73/19/8 | 83/11/6 | 89/8/3 |
| r.v. copolyamide | 0.5% m-Kr |  | 1.82 | 1.81 | 1.6 | 1.6 |
| Formula Compound |  |  |  |  |  |  |
| Copolyamide 66/6I/6T | See above | wt.-% | 44.5 | 44.5 | 44.5 | 44.5 |
| PA prepolymer: 6T/6I: 70/30 | r.v. 1.13/0.5% m-Kr | wt.-% | 4 | 4 | 4 | 4 |
| PA 66 Radipol ® A45 | Commercial article | wt.-% | 1.1 | 1.1 | 1.1 | 1.1 |
| Black carbon |  | wt.-% | 0.4 | 0.4 | 0.4 | 0.4 |
| Glass fibres |  | wt.-% | 50 | 50 | 50 | 50 |
| Properties Compound |  |  |  |  |  |  |
| units 66/6I/6T | Comp. | wt.-% | 71/19/10 | 74/18/8 | 84/11/5 | 89/8/3 |
| r.V. Compound | 0.5% m-Kr |  | 1.641 | 1.611 | 1.515 | 1.512 |
| MVI-Compound | 290° C./5 kg Pellet | ml/10 min | 25 | 36 | 73 | 98 |
| Glass transition temperature | Tg | ° C. | 71 | 72 | 67 | 65 |
| Melt temperature | Tm | ° C. | 235 | 236 | 245 | 250 |
| Melt enthalpy | dHm | J/g | 23 | 24 | 26 | 28 |
| Crystallization temperature | Tc | ° C. | 207 | 207 | 216 | 219 |
| Crystallization enthalpy | dHc | J/g | 14 | 16 | 17 | 18 |
| Velocity of crystallization | dHm/dT | J/g/mm | 5 | 6 | 9 | 7 |
| Production of specimens | Engine speed/MT/WT |  |  |  |  |  |
| Injection | rpm/° C./° C. |  |  |  |  |  |
| Elastic modulus | 250/290/100 | MPa | 17000 | 17000 | 18000 | 18000 |
| Elastic modulus, cond | 250/290/100 | MPa | 17000 | 16000 | 16000 | 16000 |
| Ult. Tensile strength | 250/290/100 | MPa | 224 | 227 | 234 | 234 |
| Ult. Tensile strength, cond | 250/290/100 | MPa | 186 | 188 | 192 | 190 |
| Elongation at tear | 250/290/100 | % | 2.4 | 2.3 | 2 | 2 |
| Elongation at tear, cond | 250/290/100 | % | 2.5 | 2.2 | 2.1 | 2.1 |

TABLE 4-continued

| | | | Ex. | | | |
|---|---|---|---|---|---|---|
| | | | VB9 | VB10 | VB11 | VB12 |
| Formula | | | Copolymer | | | |
| Compound | Condition | Unit | C5 | C6 | C7 | C8 |
| KSZ (Charpy) | 250/290/100 | KJ/m$^2$ | 11 | 11 | 12 | 12 |
| KSZ (Charpy), cond | 250/290/100 | KJ/m$^2$ | 11 | 11 | 11 | 11 |
| SZ (Charpy) | 250/290/100 | KJ/m$^2$ | 87 | 80 | 75 | 75 |
| SZ (Charpy), cond | 250/290/100 | KJ/m$^2$ | 74 | 73 | 71 | 70 |
| HDT/A (1.8 MPa) | 250/290/100 | ° C. | 215 | 219 | 234 | 241 |
| HDT/C (8 MPa) | 250/290/100 | ° C. | 154 | 169 | 200 | 211 |
| Flow length 1.5 × 10 mm | 250/290/80 | mm | | | | |
| Flow length 1.5 × 10 mm | 250/290/100 | mm | 210 | 228 | 326 | 346 |
| WT/dye lamina/3 mm | 250/290/WT | ° C. | 100 | 100 | 100 | 100 |
| Gloss 20° | Dye lamina | % | 34 | 40 | 44 | 44 |
| Gloss 60° | Dye lamina | % | 73 | 79 | 80 | 77 |
| Moisture absorption | 2 Wo/70° C./62% rF | % | 1.1 | 1.08 | 0.92 | 1.07 |

Examples 13 to 16

Reinforced Copolyamides with PA Prepolymer and PA

The production of the reinforced copolyamides with PA prepolymer and PA 66 or PA 6I/6T is performed according to the compositions according to table 5.

The moulding materials are produced on a ZSK25 type two-shaft extruder from the company Werner u. Pfleiderer. Copolyamide, PA 66 or PA 6I/6T, PA prepolymer and masterbatch pellet PA66+carbon black (Black Pearls®880) (73/27 wt.-%) are previously mixed with a roll aid agent (liquid fatty acid ester), 0.1 wt.-%, and metered into the feed zone. The glass fibre is metered into the polymer melting 3 housing units before the extrusion die by a sidefeeder.

The housing temperature was set-up as increasing profile up to 280° C. A flow rate of 8 kg was used at 150 rpm. After cooling the extruded columns in water bath the properties of pellet were measured after pelletizing and drying at 120° C.

The specimens were produced on an Arburg injection moulding installation, setting-up the cylinder temperatures from 275 to 290° C. and a screw rotation rate to 250 rpm The moulding temperature was selected to be 100° C.

TABLE 5

| | | | Ex. | | | |
|---|---|---|---|---|---|---|
| | | | B13 | B14 | B15 | B16 |
| Formula | | | Copolymer | | | |
| Compound | Condition | Unit | C5 | C6 | C7 | C8 |
| Copolyamide 66/6I/6T | Comp. | wt.-% | 70/20/10 | 73/19/8 | 83/11/6 | 89/8/3 |
| r.v. copolyamide | 0.5% m-cresol | | 1.88 | 1.844 | 1.793 | 1.795 |
| r.v. copolyamide | 1% H$_2$SO$_4$ (95.5%) | | 2.77 | 2.68 | 2.67 | 2.7 |
| Formula Compound | | | | | | |
| Copolyamide 66/6I/6T | See above | wt.-% | 38 | 42 | 40 | 37 |
| PA prepolymer: 6T/6I: 70/30 | r.v. 1.13/0.5% m-Kr | wt.-% | 4 | 4 | 4 | 4 |
| PA 6I/6T: 67/33 wt.-% | r.v. 1.50/0.5% m-Kr | wt.-% | 4.5 | 7.5 | | |
| PA 66 Radipol ® A45 | Commercial article | wt.-% | 7.6 | 3.6 | 1.1 | 1.1 |
| Black carbon | | wt.-% | 0.4 | 0.4 | 0.4 | 0.4 |
| Glass fibres | | wt.-% | 50 | 50 | 50 | 50 |
| Properties Compound | | | | | | |
| units 66/6I/6T | Comp. | wt.-% | 75/17/8 | 75/17/8 | 75/17/8 | 75/17/8 |
| r.v. Compound | 0.5% m-Kr | | 1.651 | 1.628 | 1.61 | 1.58 |
| MVI-Compound | 290° C./5 kg Pellet | ml/10 min | 18 | 29 | 58 | 56 |
| Glass transition temperature Tg | | ° C. | 69 | 68 | 66 | 66 |
| Melt temperature | Tm | ° C. | 242 | 239 | 246 | 246 |
| Melt enthalpy | dHm | J/g | 21 | 23 | 24 | 24 |

TABLE 5-continued

|  |  |  | Ex. | | | |
|---|---|---|---|---|---|---|
|  |  |  | B13 | B14 | B15 | B16 |
| Formula |  |  | Copolymer | | | |
| Compound | Condition | Unit | C5 | C6 | C7 | C8 |
| Crystallization temperature | Tc | ° C. | 211 | 208 | 214 | 214 |
| Crystallization enthalpy | dHc | J/g | 14 | 14 | 17 | 18 |
| Velocity of crystallization | dHm/dT | J/g/mm | 6 | 6 | 10 | 10 |
| Production of specimens | Engine speed/MT/WT |  |  |  |  |  |
| Injection | rpm/° C./° C. |  |  |  |  |  |
| Elastic modulus | 250/290/100 | MPa | 17000 | 17000 | 17000 | 16000 |
| Elastic modulus, cond | 250/290/100 | MPa | 17000 | 17000 | 17000 | 16000 |
| Ult. Tensile strength | 250/290/100 | MPa | 225 | 221 | 230 | 223 |
| Ult. Tensile strength, cond | 250/290/100 | MPa | 192 | 190 | 196 | 185 |
| Elongation at tear | 250/290/100 | % | 2 | 2 | 2.3 | 2.1 |
| Elongation at tear, cond | 250/290/100 | % | 2.3 | 2.3 | 2.3 | 2.1 |
| KSZ (Charpy) | 250/290/100 | kJ/m$^2$ | 13 | 11 | 12 | 12 |
| KSZ (Charpy), cond | 250/290/100 | kJ/m$^2$ | 12 | 11 | 11 | 11 |
| SZ (Charpy) | 250/290/100 | kJ/m$^2$ | 85 | 73 | 88 | 81 |
| SZ (Charpy), cond | 250/290/100 | kJ/m$^2$ | 72 | 74 | 70 | 66 |
| HDT/A (1.8 MPa) | 250/290/100 | ° C. | 223 | 222 | 228 | 231 |
| HDT/C (8 MPa) | 250/290/100 | ° C. | 170 | 174 | 184 | 182 |
| Flow length 1.5 × 10 mm | 250/290/80 | mm |  |  |  |  |
| Flow length 1.5 × 10 mm | 250/290/100 | mm | 210 | 223 | 250 | 262 |
| WT/dye lamina/3 mm | 250/290/WT | ° C. | 100 | 100 | 100 | 100 |
| Gloss 20° | Dye lamina | % | 34 | 40 | 41 | 43 |
| Gloss 60° | Dye lamina | % | 73 | 78 | 78 | 80 |
| Moisture absorption | 2 Wo/70° C./62% rF | % | 1.07 | 1.09 | 1.05 | 1.05 |

Comparison Examples 17 to 43

Reinforced Copolyamides, Set-up of the Viscosity

FIG. 1 is a graph and showing a comparison between the relative viscosity and the gloss of the compound of the examples 17 to 43, wherein the symbol ¢ symbol shows the values for the gloss measured at 20° and ♦ the symbol shows the values for the gloss at 60°.

It would be clear, by means of the following examples and the following FIG. 1, that the viscosity of the Compound has a decisive influence to the surface quality of the moulding part. Advantageous gloss values were found, when the relative viscosity of the Compound, as measured in 0.5% m-cresol, is below 1.6. It is clear by means of the comparison examples VB 32 to VB 35 that a PA 66/6I/6T copolymer comes off better as a PA 66/6I copolymer.

TABLE 6

|  | Property | VB17 C9 | VB18 C9 | VB19 C10 | VB20 C10 | VB21 C11 | VB22 C11 | VB23 C12 | VB24 C12 | VB25 C13 | VB26 C13 | B27 C8 | B28 C7 | VB29 C6 |
|---|---|---|---|---|---|---|---|---|---|---|---|---|---|---|
| Copolyamide | wt.-% | 48.5 | 44.5 | 48.5 | 44.5 | 48.5 | 44.5 | 48.5 | 44.5 | 48.5 | 44.5 | 37 | 40 | 42 |
| Copolyamide r.v./0.5% m-Kr |  | 1.583 | 1.583 | 1.883 | 1.883 | 1.874 | 1.874 | 1.896 | 1.896 | 1.864 | 1.864 | 1.795 | 1.793 | 1.844 |
| PA 66 |  |  |  |  |  |  |  |  |  |  |  |  |  | 2.5 |
| PA 6I/6T (67/33 wt.-%, r.v. = 1.50) | wt.-% |  |  |  |  |  |  |  |  |  |  | 7.5 | 4.5 |  |
| MB (PA 66 + black carbon 25 wt.-%) | wt.-% | 1.5 | 1.5 | 1.5 | 1.5 | 1.5 | 1.5 | 1.5 | 1.5 | 1.5 | 1.5 | 1.5 | 1.5 | 1.5 |
| Glass fibres | wt.-% | 50 | 50 | 50 | 50 | 50 | 50 | 50 | 50 | 50 | 50 | 50 | 50 | 50 |
| PA 6T/6I (70/30 wt.-%: precondensate) | wt.-% |  | 4 |  | 4 |  | 4 |  | 4 |  | 4 | 4 | 4 | 4 |
| Linkage ratio PA 66/6I/6T, wt.-% | 10 | 70/19/ 10 | 70/19/ 10 | 75/17/8 | 75/17/8 | 80/13/7 | 80/13/7 | 75/12/ 12 | 75/12/ 12 | 75/8/17 | 75/8/17 | 75/17/8 | 75/17/8 | 75/17/8 |
| Relative viscosity (0.5% m-Kr) |  | 1.569 | 1.474 | 1.849 | 1.626 | 1.852 | 1.616 | 1.875 | 1.625 | 1.87 | 1.629 | 1.58 | 1.61 | 1.628 |
| MVI 290° C./ 5 kg | ccm/ 10 min | 69.8 | 69.6 | 39.5 | 38.4 | 31.3 | 49.8 | 33.1 | 56 | 31.5 | 45.3 | 56 | 58 | 29 |
| Melt temperature | ° C. | 236.6 | 233.6 | 241.1 | 239.6 | 245.5 | 244.2 | 245.7 | 243.3 | 251.4 | 250.1 | 245.8 | 246 | 238.8 |
| Melt enthalpy | J/g | 23.8 | 18 | 20.7 | 22.4 | 24.6 | 23.2 | 23.6 | 24.1 | 25.1 | 25.7 | 23.7 | 24.4 | 22.5 |
| Tg | ° C. | 64.7 | 71.5 | 67.2 | 67.4 | 64.7 | 66 | 69 | 69.9 | 66.5 | 69.7 | 66.2 | 66.3 | 68.3 |

TABLE 6-continued

| | | | | | | | | | | | | | | |
|---|---|---|---|---|---|---|---|---|---|---|---|---|---|---|
| Crystallization temperature | ° C. | 208.1 | 204.3 | 209.6 | 211.9 | 215.5 | 215.6 | 216.1 | 217.6 | 223 | 226.2 | 213.5 | 213.5 | 208.3 |
| Crystallization enthalpy | J/g | 17.6 | 12 | 18 | 14.4 | 19.6 | 15.1 | 18.3 | 15.7 | 18.2 | 15.7 | 17.6 | 17.3 | 14.3 |
| Velocity of crystallization | J/g/min | 6.4 | 4.6 | 8.2 | 6 | 13.4 | 7.6 | 10 | 7.8 | 11.4 | 7.9 | 9.5 | 9.5 | 5.7 |
| Flow length | mm | 345 | 390 | 215 | 280 | 215 | 272 | 214 | 278 | 205 | 264 | 262 | 250 | 223 |
| Gloss 20° | | 37 | 42 | 34 | 39 | 33 | 37 | 36 | 42 | 31 | 44 | 43 | 41 | 40 |
| Gloss 60° | | 76 | 79 | 72 | 76 | 70 | 74 | 72 | 77 | 66 | 78 | 80 | 78 | 78 |

| | Property | VB30 C5 | VB32 C14 | VB33 C14 | VB34 C15 | VB35 C15 | VB36 C1 | VB37 C1 | VB38 C2 | VB39 C2 | VB40 C3 | VB41 C3 | VB42 C4 | VB43 C4 |
|---|---|---|---|---|---|---|---|---|---|---|---|---|---|---|
| Copolyamide | wt.-% | 38 | 48.5 | 44.5 | 48.5 | 44.5 | 48.5 | 44.5 | 48.5 | 44.5 | 48.5 | 44.5 | 48.5 | 44.5 |
| Copolyamide r.v./0.5% m-Kr | | 1.88 | 1.42 | 1.42 | 1.61 | 1.61 | 1.82 | 1.82 | 1.81 | 1.81 | 1.6 | 1.6 | 1.6 | 1.6 |
| PA66 | wt.-% | 6.5 | | | | | | | | | | | | |
| PA 6I/6T (67/33 wt.-%, r.v. = 1.50) | wt.-% | | | | | | | | | | | | | |
| MB (PA 66 + Black carbon 25 wt.-%) | wt.-% | 1.5 | 1.5 | 1.5 | 1.5 | 1.5 | 1.5 | 1.5 | 1.5 | 1.5 | 1.5 | 1.5 | 1.5 | 1.5 |
| Glass fibres | wt.-% | 50 | 50 | 50 | 50 | 50 | 50 | 50 | 50 | 50 | 50 | 50 | 50 | 50 |
| PA 6T/6I (70/30 wt.-%: precondensate) | wt.-% | 4 | | 4 | | 4 | | 4 | | 4 | | 4 | | |
| Linkage ratio PA 66/6I/6T, wt.-% | | 75/17/8 | 74/26/0 | 74/26/0 | 74/17/9 | 74/17/9 | 71/19/10 | 71/19/10 | 74/18/8 | 74/18/8 | 84/11/5 | 84/11/5 | 89/8/3 | 89/8/3 |
| Relative viscosity (0.5% m-Kr) | | 1.651 | 1.423 | 1.432 | 1.413 | 1.452 | 1.833 | 1.641 | 1.778 | 1.611 | 1.668 | 1.515 | 1.645 | 1.512 |
| MVI 290° C./ 5 kg | ccm/ 10 min | 18 | 141 | 313 | 206 | 330 | 12 | 25 | 29 | 36 | 92 | 73 | 107 | 98 |
| Melt temperature | ° C. | 242.1 | 228 | 235 | 228 | 236 | 235 | 235 | 237 | 236 | 248 | 245 | 252 | 250 |
| Melt enthalpy | J/g | 20.8 | 20 | 22 | 23 | 23 | 23 | 23 | 24 | 24 | 27 | 26 | 28 | 28 |
| Tg | ° C. | 68.9 | 64.2 | 71.1 | 64.3 | 70.2 | 67.2 | 71.4 | 64.5 | 72.2 | 56.9 | 67 | 55 | 65 |
| Kristallisations temperature | ° C. | 210.7 | 202 | 208 | 202 | 209 | 203 | 207 | 204 | 207 | 220 | 216 | 224 | 219 |
| Kristallisations enthalpy | J/g | 14 | 18 | 15 | 18 | 17 | 16 | 14 | 18 | 16 | 22 | 17 | 22 | 18 |
| Velocity of crystallization | J/g/min | 5.6 | 10 | 6 | 9 | 6 | 7 | 5 | 9 | 6 | 10 | 9 | 11 | 7 |
| Flow length | mm | 210 | 334 | 366 | 346 | 374 | 158 | 210 | 174 | 228 | 258 | 326 | 257 | 346 |
| Gloss 20° | | 34 | 52 | 47 | 51 | 56 | 27 | 34 | 29 | 40 | 35 | 44 | 28 | 44 |
| Gloss 60° | | 73 | 87 | 83 | 86 | 87 | 66 | 73 | 62 | 79 | 71 | 80 | 66 | 77 |

Measurement of the Properties

The properties with the indication "cond" were measured on conditioned specimens. The conditioning was performed according to ISO1110. Each remaining properties were determined on dry specimens.

The measurement of the thermal data was performed with dried pellet (24 hours, 120° C.) in a Perkin Elmer DSC device having heating rates of 20° C./min and cooling rates of 5° C./min.

The melt temperature was measured according to ISO 3146-C. The crystallisation temperature, crystallisation enthalpy and velocity of crystallisation were determined during the first cooling cycle (5° C./min). The sample was heated up to Tg+20° C. and quenched, then, it is measured during the second heating cycle (20° C./min) to determine the glass transition temperature Tg.

The mechanical properties elastic modulus, ultimate tensile strength, and elongation at tear were determined by tensile test on standard-specimens according to ISO 527.

The measurement of the impact resistance (SZ) and notched bar impact value (KSZ) was performed according to Charpy at 23° C. according to ISO 179 eU and ISO 179 eA.

The determination of the HDT/A (1.8 MPa) and HDT/C (8 Mpa) was measured according to ISO 75.

The flow lengths were determined in a spiral form 1.5×10 mm and 1000 bar.

The gloss measurements were performed on dye lamina having a thickness of 3 mm with an Minolta-colorimeter.

What is claimed is:

1. Semiaromatic semi-crystalline thermoplastic polyamide moulding materials comprising at least three of the following components (A), (B), (C) as polyamide matrix:
   (A) 42 to 98 wt.-% of a semi-crystalline copolyamide formed by
      ($a_1$) 47 to 90 wt.-% of units derived from adipic acid in combination with hexamethylene diamine in approximate equimolar ratio or from caproplactam and/or from ω-amino acids having 6 C atoms,
      ($a_2$) 50 to 7 wt.-% of units derived from isophthalic acid in combination with hexamethylene diamine in approximate equimolar ratio,
      ($a_3$) 40 to 3 wt.-% of units derived from terephthalic acid in combination with hexamethylene diamine in a approximate equimolar ratio,
      wherein the weight percentage of the components ($a_1$) to ($a_3$) add up all together to 100%;

(B) 9 to 1 wt.-% of prepolymeric polyamides having a solution viscosity ($\eta$rel.) of 1.01–1.30, as measured in 0.5% m-cresol, formed by
  ($b_1$) 40 to 90 wt.-% of units derived from terephthalic acid in combination with hexamethylene diamine in approximate equimolar ratio,
  ($b_2$) 50 to 10 wt.-% of units derived from isophthalic acid in combination with hexamethylene diamine in approximate equimolar ratio,
  ($b_3$) 0 to 50 wt.-% of units derived from adipic acid in combination with hexamethylene diamine in approximate equimolar ratio, from caproplactam, or from $\omega$-amino acids having 6 C atoms,
  wherein the weight percentage of the components ($b_1$) to ($b_3$) add up all together 100%;
(C) 49 to 1 wt.-% of an amorphous copolyamide formed by
  ($c_1$) 40 to 90 wt.-% of units derived from isophthalic acid in combination with hexamethylene diamine in equimolar ratio,
  ($c_2$) 50 to 10 wt.-% of units derived from terephthalic acid in combination with hexamethylene diamine in equimolar ratio,
  ($C_3$) 0 to 50 wt.-% of units derived from adipic acid in combination with hexamethylene diamine in approximate equimolar ratio, from caproplactam, or from $\omega$-amino acids having 6 C atoms,
  wherein the weight percentage of the components ($c_1$) to ($c_3$) add up all together 100%;
  and wherein further additives (D), (E) and (F) can be comprised in the moulding materials:
(D) 0 to 70 wt.-% of a fibrous, particle type filling material, or reinforcing material or mixtures thereof,
(E) 0 to 6 wt.-% of carbon black,
(F) 0 to 30 wt.-% of usual additives and processing aid agents,
  wherein the weight percentages of the components (A) to (F) add up all together 100%.

2. Polyamide moulding materials according to claim 1, comprising at least three of the following components (A), (B), (C) as polymer matrix:
  51 to 94 wt.-% of semi-crystalline copolyamide (A),
  1 to 9 wt.-% of prepolymeric polyamides (B),
  5 to 40 wt.-% of amorphous polyamide (C),
  and, in addition, following components can be comprised in the moulding materials:
    (A) 0 to 70 wt.-% of a fibrous or particle type filling or reinforcing material or mixtures thereof,
    (E) 0 to 6 wt.-% of carbon black, and
    (F) 0 to 30 wt.-% of usual additives and processing aid agents,
  wherein the weight percentages of the components (A) to (F) make up together 100%.

3. Polyamide moulding materials according to claim 1, wherein the semi-crystalline copolyamide (A) to adjust the relative viscosity ($\eta$rel.) as measured in 0.5% m-cresol, in the range of 1.4 to 1.9, and the copolyamide (C) to adjust the relative viscosity ($\eta$rel.) as measured in 0.5% m-cresol, in the range of 1.35 to 1.7, contain regulators or modifiers selected from the group of the monoamines having the general formula $CH_3$—($R_1$)—NH—($R_2$)—$CH_3$, wherein $R_1$ and $R_2$, each independently, mean 0 to 36 $CH_2$-groups, or from the group of the monocarboxylic acids having the general formula $CH_3$—($R_1$)—COOH, wherein $R_1$ means 0 to 36 $CH_2$-groups, or mixtures thereof.

4. Polyamide moulding materials according to claim 3, wherein the modifiers or the regulator are selected from the group of stearylamine, cyclohexylamine, aniline, propylamine and nonylamine, or mixtures thereof.

5. Polyamide moulding materials according to claim 3, wherein the modifiers or the regulators are selected from the group of formic acid, stearic acid, palmitic acid, cyclohexanecarboxylic acid, acetic acid, benzoic acid, or from the group of the 4-amino-2,2,6,6-tetraalkylpiperidine, the 2,6-dialkylphenols or mixtures of the aforementioned compounds.

6. Polyamide moulding materials according to claim 3, wherein the semi-crystalline copolyamide (A) comprises 0.5 to 5 mol-% of regulator or modifier, based on 100 mol-% of diamine.

7. Polyamide moulding materials according to claim 1, wherein the semi-crystalline copolyamide (A), the prepolymeric polyamide (B), or the amorphous copolyamide (C) comprises catalytically active compounds on the basis of hypophosphorous acid, phosphorous acid, phosphoric acid in amounts of 10 to 500 mg/kg.

8. Polyamide moulding materials according to claim 7, wherein wherein the semi-crystalline copolyamide (A), the prepolymeric polyamide (B), or the amorphous copolyamide (C) further comprises antioxidants selected from the group of the sterically hindered hydroxyphenols or HALS stabilizers in amounts of 0.05–5 wt.-% based on the polymerization formulation of the semi-crystalline copolyamide (A), the prepolymeric polyamide (B), or the amorphous polyamide (C), respectively.

9. Polyamide moulding materials according to claim 1, wherein antifoaming agents on the basis of silicones and derivates of silicone arc comprised in the polymerization formulation of the semi-crystalline copolyamide (A), or the polymerization formulation of the prepolymeric polyamides (B), or the polymerization formulation of the amorphous polyamide (C), wherein the silicones and derivates of silicone are present in stable aqueous emulsion with silic acids in concentrations of 10 to 500 ppm.

10. Polyamide moulding materials according to claim 1, wherein additives from the group of layered silicates, being present in exfoliated form within the final product are comprised in the polymerization formulation of the polyamide components the semi-crystalline copolyamide (A), the prepolymeric polyamide (B), or the amorphous copolyamide (C).

11. Polyamide moulding materials according to claim 10, wherein the additives are selected form the group of montmorillonite, bentonite, or mica.

12. Polyamide moulding materials according to claim 1, wherein additives from the group of layered silicates are used directly during the extrusion of the moulding materials.

13. Polyamide moulding materials according to claim 1, wherein release agents and lubricants are comprised in the polymerisation formulation of the semi-crystalline copolyamide (A), the prepolymeric polyamide (B), or the amorphous copolyamide (C).

14. Polyamide moulding materials according to claim 13, wherein release agents and lubricants comprise glyceric monostearates.

15. Polyamide moulding material according to claim 1, wherein the semi-crystalline copolyamide (A) has a relative viscosity as measured in 0.5% solution of m-cresol between 1.4 and 19.

16. Polyamide moulding materials according to claim 1, wherein the prepolymeric polyamide (B) has a relative viscosity as measured in 0.5% solution m-cresol between 1.01 and 1.3.

17. Polyamide moulding materials according to claim 1, wherein the amorphous copolyamide (C) has a relative viscosity as measured in 0.5% solution of m-cresol between 1.35 and 1.70.

18. Polyamide moulding materials according to claim 1, wherein the reinforcing materials are comprised in amounts of 30 to 70 wt.-%, based on the total moulding material.

19. Polyamide moulding materials according to claim 18, wherein the reinforcing materials are selected from the group of glass fibres, glass rovings, glass globes, glass powder, polymer fibres, carbon fibres, metal fibres or mineralic materials.

20. Polyamide moulding materials according to claim 18, wherein the reinforcing materials are selected from the group of talcum, kaolin, wollastonite or of the layered silicates.

21. Polyamide moulding materials according to claim 1, wherein the usual additives and processing agents (F) are selected from the group of stabilizers, lubricants, dyes, metal splinters, metal pigments, stamped metal splinters, flame retardants, impact-resistant modifiers, antistaticas, conductive additives, anti-tarnishing agents, mould release agents, optical brightening agents, aromatics or mixtures thereof.

22. Polyamide moulding materials according to claim 1, further comprising 2 to 6 wt.-% of polyamide 12.

23. Polyamide moulding materials according to claim 1, being used for production or molded articles, hollow parts, sheets and fibres.

24. Polyamide moulding materials according to claim 1, being formed as molded articles.

* * * * *